United States Patent Office 3,429,735
Patented Feb. 25, 1969

3,429,735
HIGH WET STRENGTH WEBS IMPREGNATED WITH POLYMERIC ALCOHOL
Douglas J. Bridgeford, Danville, Ill., assignor to Tee-Pak, Inc., a corporation of Illinois
No Drawing. Continuation-in-part of application Ser. No. 473,236, July 19, 1965. This application Apr. 10, 1967, Ser. No. 629,397
U.S. Cl. 117—62
Int. Cl. B44d 1/44; C09d 3/12
5 Claims

ABSTRACT OF THE DISCLOSURE

High wet strength webs are prepared by impregnating and coating a fibrous web, such as a paper, with an aqueous solution of a polymeric alcohol xanthate and regenerating a polymeric alcohol on the web by acid or thermal treatment. The xanthate solution used is preferably a xanthate of a polyvalent metal and thus produces a reinforced web upon regeneration which contains a salt or oxide or hydroxide of the polyvalent metal as a pigment.

Cross reference to related applications

This application is a continuation in part of my copending application Ser. No. 473,236, filed July 19, 1965, now U.S. Patent No. 3,330,820 which is in turn a continuation-in-part of patent applications Ser. No. 269,739, filed Apr. 1, 1963; now abandoned, and Ser. No. 200,621, filed June 7, 1962, now U.S. Patent 3,291,789.

Background of the invention

Viscose has been known as an intermediate in the preparation of cellulose compositions for about seventy years. Sodium celulose xanthate was discovered by Cross and Bevan in 1892. It results from the interaction of carbon disulfide and alkali cellulose. A dilute aqueous alkaline solution of sodium cellulose xanthate is known as viscose ("viscous cellulose") and consists of a mixture of sodium cellulose xanthates of varying molecular size, loosely combined with sodium hydroxide, and dispersed in this solution together with alkalization and xanthation by-products. In commercial practice, viscose is allowed to age until it reaches the desired ripeness and then is extruded through a die into an acid medium (or other coagulating agent) to regenerate cellulose having the configuration of the die through which the viscose was extruded. Thus, viscose is extruded through fine holes to produce filaments, through slits to produce films, or through an annular opening to produce a tube. Viscose has also been used for impregnating paper or fabric for regenerating cellulose therein by treatment with an acid.

Polymeric alcohols, as a class, are known to form alkali derivatives of which the corresponding xanthates can be prepared by reaction with carbon disulfide. Thus, xanthates can be prepared from polysaccharides, including cellulose, starch, amylose, dextran, sugar, etc., and other polymeric alcohols, such as polyvinyl alcohol, polyallyl alcohol, etc. These xanthates can be regenerated by acid or thermal treatment to prepare films, filaments, tubes, and the like. The purification of polymeric alcohol xanthate salts and the regeneration of films or other shaped products therefrom present problems which are similar to the purification and regeneration of celulose from viscose.

A number of derivatives of cellulose xanthates are known in the literature and are generally prepared by precipitation from viscose by treatment with various salts. The treatment of viscose with salts will produce certain derivatives of cellulose xanthate but generally results in the coagulation of the product and the preparation of a material which is insoluble and difficultly dispersible in water or other solvents. While derivatives of xanthates of cellulose and other polymeric alcohols are known in the literature, these materials are difficult to prepare and to purify and generally cannot be prepared in the form of stable solutions or dispersions.

In the preparation of viscose and other polymeric alcohol xanthates, many undesired by-products are formed. In the past, viscose and other xanthate solutions have been regenerated by treatment with acid with the result that relatively large amounts of salts are formed within the regenerated material. In many cases, these salts are highly undesirable in the product. It has been impractical to reduce the proportion of salt in the product regenerated polymeric alcohol, e.g., cellulose, by neutralization of the aqueous caustic xanthate solution prior to regeneration due to the fact that any attempt to neutralize excess caustic with strong acid results in a localized region of very low pH and high salt concentration which tends to coagulate the polymeric alcohol and produce a heterogeneous product.

In my copending patent application, Ser. No. 200,621, filed June 7, 1962, now U.S. Patent 3,291,789, a process was disclosed in which film-forming polysaccharides, such as cellulose, starch, amylose, dextran, etc., in the form of caustic xanthate solutions are decausticized by dialysis, ion exchange, and/or ion retardation.

That process is of primary interest for decausticizing viscose solutions or caustic solutions of amylose xanthate but is also applicable to the decausticizing of caustic aqueous solutions of other polymeric alcohol xanthates. In my process described in said copending application, an aqueous caustic solution, preferably containing 0.1–7.0% wt. of a polymeric alcohol xanthate, is subjected to dialysis or to treatment with an ion exchange or ion retardation resin. In most cases, it is preferred to work with more dilute solutions to avoid the formation of a gel as the solution is decausticized. That process results in the formation of xanthate solutions, such as viscose or amylose xanthate, which are substantially free of alkali.

In the parent application Ser. No. 743,236 it is disclosed that polymeric alcohols, particularly polysaccharides, including cellulose, starch, amylose, dextran, polyvinyl alcohol, polyallyl alcohol, etc., in the form of xanthate solutions can be converted by an ion exchange reaction into various derivative salts which are relatively stable in aqueous or nonaqueous solutions. The derivative salts in many cases are novel compounds, and the stable aqueous solutions of these salts are generally unknown in the literature.

This process is of primary interest for converting viscose solution into solutions of various cellulose xanthate salts or for converting solutions of sodium amylose xanthate into analogous derivative salts. However, the process is also applicable in converting other solution of polymeric alcohol xanthates into the corresponding salts. In carrying out the process of this invention, the reaction conditions are not especially critical. It is preferred to work with the viscose or other polymeric alcohol xanthate solutions in somewhat dilute form for conveniences in handling. In general, it is preferred to work with aqueous (or nonaqueous) solutions containing 0.7–7.0% wt. of a polymeric alcohol in the form of xanthate.

The process can be carried out batchwise or continuously, but it is preferred to pass the dilute polymeric alcohol xanthate solution through a column containing an ion exchange resin in the form of a salt of the desired cation. In carrying out this invention, the starting xanthate solution is contacted with a cation exchange resin in the salt form. When the xanthate solution is passed countercurrently through a column of ion exchange resin in the salt form, the solution is converted to a xanthate derivative salt of the cation which was initially present in the exchange resin.

It is generally essential to subject the starting material, i.e., solution of polymeric alcohol xanthate, to dialysis or to ion exchange or ion retardation to remove excess alkali prior to the treatment with the exchange resin or other exchange material containing the desired cation. When the polymeric alcohol xanthate solution is given such a preliminary treatment, the yields based on the cation content of the exchange resin are greater since less of the desired cation is used in ion exchange reaction with free alkali or other cations present in the solution. Also, this preliminary treatment is necessary where the exchange cation is polyvalent.

The product xanthate salts can be coagulated or acid or thermally regenerated. The coagulated or regenerated product can then be treated with other reagents, or impregnated with plasticizers, colorants, antiblocking agents, or coated, etc. The crude or purified xanthate derivative can also be used as an organic intermediate.

Summary of the invention

This invention consists of a new and improved process for the preparation of high wet strength webs, such as paper webs, by impregnation with a solution of a polymeric alcohol xanthate followed by acid or thermal regeneration of the polymeric alcohol in the web. Generally, the web is treated with a solution of a xanthate salt of a polymeric alcohol wherein the salt is of a cation selected from the group consisting of monovalent metal cations other than sodium, divalent metal cations, trivalent metal cations, and nonmetal cations. A preferred form of the invention utilizes solutions of polymeric alcohol xanthates of polyvalent metals in treating the web or paper with the result that the web or paper is simultaneously impregnated with a regenerated polymeric alcohol and with salts or hydroxides or oxides of the polyvalent metal which results in the situ formation of a pigment.

Description of the preferred embodiments

The following nonlimiting examples are illustrative of the preparation of various xanthate salt solutions by ion exchange reaction:

EXAMPLE 1

A solution of triethylamine cellulose xanthate was prepared from viscose by ion exchange reaction.

A tubular steel column was charged with an anion exchange resin which was converted to the hydroxyl form. The column was charged with Dowex 1X8, 20–50 mesh resin in the chloride form and converted to the hydroxyl form by treatment with dilute sodium hydroxide. A second column was prepared using Dowex 50WX8 cation exchange resin in the acid form. The cation exchange resin was treated with a 5% solution of triethylamine to convert the resin in the column to the triethylammonium salt of the resin.

A commercial viscose solution, ripened and ready for extrusion, and containing about 8% cellulose, 6.6% total alkali (total of free sodium hydroxide and combined sodium in the cellulose xanthate), 0.9% xanthate sulfur, and having a DP of about 500 (degree of polymerization), was diluted to a 0.5% cellulose content solution.

The anion exchange column was attached to a suction flask by means of a 2-hole rubber stopper, with a bleed-off line consisting of glass and rubber tubing and a screw clamp occupying the other hole. Vacuum was applied, and the water remaining in the column was drawn off until the water level reached the resin level. The dilute viscose was poured in and the first few milliliters passed through. The column was then disconnected and reconnected to a 500 ml. suction flask maintained in an ice bath. The remainder of the cold dilute viscose was passed through the column. The viscose was purified by removal of anionic impurities and was obtained as a light greenish yellow liquid. A bright orange layer, about 1½" deep, appeared at the top of the column as the resin absorbed by-products from the viscose. Distilled water was then allowed to pass slowly through the column to remove viscose, and the layer of spent resin was removed from the column.

The purified viscose was then neutralized to pH 6 by stirring with 20–50 mesh Amberlite IRC 50 H+ exchange resin. This purified, neutralized viscose was suction filtered to remove resin beads and was passed through the cation resin column (in the triethylammonium form) at a flow rate of about one drop per second. This column was attached to a second suction flask maintained under refrigeration, and the same procedure was followed as in the treatment using the anion exchange column. The column was washed as soon as all of the viscose had passed through.

The product obtained from the cation exchange column was a dispersion and solution of triethylamine salt of cellulose xanthate. In identifying the product of this reaction, xanthate sulfur determinations were performed on duplicate 50 ml. aliquots of the product immediately. Triplicate 10 ml. aliquots were withdrawn and emptied into 30 ml. Kjeldahl digestion flasks containing catalyst and sulfuric acid for total nitrogen determination. Duplicate analyses showed 12.88% and 12.94% xanthate sulfur in the cellulose derivative based on the weight of the cellulose present. The nitrogen analyses showed 1.61%, 1.57% and 1.59% nitrogen present, based on the cellulose content.

Since the percentages of xanthate sulfur and nitrogen were known, the ratio of the sulfur atoms to nitrogen atoms was calculated and found to correspond to the theoretical values for the triethylamine salt of cellulose xanthate.

When a solution of the triethylamine salt of cellulose xanthate is formed into a film on a glass plate using a drawbar, the film can be regenerated either by treatment with acid or by heating for 15–30 min. at 100° C. The cellulose film which is prepared in this manner is substantially free of reaction by-products since the by-products are essentially volatile. When a solution of the triethylamine salt of cellulose xanthate is impregnated into a long fiber hemp paper and then heated for 15–30 min. at 100° C. a paper reinforced regenerated cellulose film is produced which is substantially free of reaction by-products.

EXAMPLE 2

Another experiment was carried out in which dilute viscose was converted by ion exchange reaction to the barium salt of cellulose xanthate.

A stainless steel column was charged with Dowex 1X8, 20–50 mesh resin and converted to the hydroxyl form by treatment with dilute sodium hydroxide. A second column was charged with Dowex 50WX8 ion exchange resin in the hydrogen ion form and converted to the barium form by treatment with a barium salt solution.

The viscose used in this experiment was the same as used in Example 1 but was diluted to a 0.25% cellulose content. The dilute viscose was purified by first passing it through the anion exchange column (containing Dowex 1X8 OH—) as in Example 1. The treated viscose was then mixed with Amberlite IRC 50 H+ resin to neutralize most of the free alkali content.

The diluted and neutralized viscose was then passed through the barium-containing ion exchange column using the procedure described in Example 1, and an effluent was obtained which was a stable solution of barium cellulose xanthate.

A 200-ml. portion of barium cellulose xanthate was poured into 800 ml. of methanol at −20° C. to form a gel suitable for extended storage. Ten days later, a total sulfur determination showed 8.63% sulfur based on the weight of cellulose present. Barium was determined by adding hydrochloric acid to precipitate the cellulose, which was filtered and washed several times with water and then weighed. The pH of the filtrate was adjusted to pH 5 and heated to 70° C. Fifty ml. of 0.68% sulfate ion (as sodium sulfate) was added to the filtrate, dropwise with stirring, and the precipitated barium sulfate digested overnight before filtering. The barium sulfate was ignited gently for 5 min., cooled, and 2 drops of sulfuric acid were added to oxidize any barium sulfide to barium sulfate. The crucible was heated gently until evolution of sulfur dioxide fumes ceased and then was ignited to constant weight. Duplicate analyses showed 10.13% and 10.25% barium. The ratio of sulfur atoms to barium atoms was substantially theoretical for the barium cellulose xanthate salt.

When a solution of barium cellulose xanthate, prepared as described above, is formed into a film on a glass plate using a drawbar and regenerated, the resulting film is pigmented by the by-product barium salts. The barium cellulose xanthate film can be regenerated either by treatment with strong acid or by heating to 100° C. for 15–30 min. When a solution of barium cellulose xanthate is impregnated into a long fiber hemp paper and regenerated by heating to 100° C. for 15–30 min. there is produced a paper-reinforced cellulose film which is pigmented by the barium salts which are produced as a by-product of the decomposition of the barium cellulose xanthate.

EXAMPLE 3

A stainless steel column was charged with Dowex 1X8, 20–50 mesh anion exchange resin and converted to the hydroxyl form by treatment with dilute sodium hydroxide. A cation column of similar size was prepared by passing a cadmium salt solution through a bed of Dowex 50WX8 H+ ion exchange resin.

In this experiment, the same viscose was used as in Example 1 but was diluted to a 0.25% cellulose content. The dilute viscose was purified by passing through the anion exchange column as in Example 1 and then mixed with Amberlite IRC 50 H+ cation exchange resin to neutralize the solution to pH 9.

The neutralized and diluted viscose was then passed through the anion exchange column containing combined cadmium ions. The effluent from the column was a solution of cadmium cellulose xanthate.

The effluent from the column was clear until about 100 ml. had passed through, at which time the effluent became slightly cloudy. For analysis, a 191 m. portion of the cadmium cellulose xanthate solution was poured into cold methanol to precipitate a gel. The cadmium cellulose xanthate gel was then analyzed for total sulfur content, xanthate sulfur content, cadmium content, and sulfur/cadmium atomic ration. Duplicate total sulfurs were run on the cadmium cellulose xanthate gel, using the method of oxidizing the sulfur to sulfate with bromine water and precipitating sulfate as barium sulfate. The sulfur content of the gel was 7.17%. Duplicate cadmium analyses were run by precipitating cadmium ion as cadmium pyrophosphate. The cadumium content of the product was found to be 6.72% and 6.80% in the samples tested.

The ratio of sulfur atoms to cadmium atoms in the product was 3.67:1. The product obtained in the cation exchange treatment of diluted and neutralized viscose was established to be the cadmium salt of cellulose xanthate.

When a dilute solution of cadmium cellulose xanthate is extruded through a thin slit into an acid bath, a film is obtained of regenerated cellulose pigmented with by-product cadmium salts. When a dilute solution of cadmium cellulose xanthate is impregnated into a long fiber hemp web and then regenerated by heating to 100° C. for 15–30 min. there is produced a fiber-reinforced regenerated cellulose film which is pigmented with the cadmium salts that constitute the by-products of the decomposition of the cadmium cellulose xanthate.

EXAMPLE 4

In this example, the procedure of Example 1 was followed except that the cation exchange column was converted to a pyridine salt by passing 5% pyridine through Dowex 50WX8 H+ exchange resin. The viscose was diluted to a 0.5% cellulose content, passed through the anion exchange column, and treated with Amberlite IRC 50 H+ resin as in Example 1. The diluted and neutralized viscose was then passed through the column containing the cation resin (Dowex 50WX8 H+) in the pyridine salt form. The effluent from the column consisted of an aqueous solution of pyridine cellulose xanthate.

The pyridine cellulose xanthate was precipiated in cold methanol and identified by sulfur and nitrogen analyses as in Example 1.

When a solution of pyridine cellulose xanthate is extruded through an annular opening into an acid bath, a tubular casing of regenerated cellulose is obtained. Similarly, pyridine cellulose xanthate solution can be extruded into a hot liquid, such as hot mineral oil, to thermally regenerate the cellulose. When a solution of pyridine cellulose xanthate is impregnated into a long fiber hemp web and regenerated thermally there is produced a high wet strength regenerated cellulose film which is reinforced with the hemp fibers.

EXAMPLE 5

In this example, viscose was converted to potassium cellulose xanthate following the procedure used in Example 1. An anion exchange resin was prepared in the hydroxyl form as in Example 1, and a cation exchange resin. Dowex WX8 H+, was converted to the potassium form by treatment with a solution of a potassium salt.

In this example, the viscose used was the same as in Example 1 but was diluted to a cellulose content of 0.25%. The diluted viscose was purified by passing through the anion exchange column and then mixed with Amberlite IRC 50 H+ resin to reduce the pH to a value of 7. The purified and neutralized viscose was then passed through the column containing Dowex WX8 in the potassium salt form. The effluent from the column consisted of a stable solution of potassium cellulose xanthate.

The product was analyzed by first precipitating the potassium cellulose xanthate as a gel in cold methanol. Duplicate sulfur analyses were run, and potassium analyses were run using the method of precipitating potassium as cobaltinitrite. The product analyzed about 5% potassium and had a sulfur/potassium atomic ratio of 3.71:1.

When a solution of potassium cellulose xanthate is impregnated into a long fiber hemp web and regenerated thermally or by treatment with acid a high wet strength fiber-reinforced regenerated cellulose film is produced.

EXAMPLE 6

The procedure described in the previous examples was followed in converting viscose to calcium cellulose xanthate.

The viscose was the same as in the previous examples but was diluted to a 0.5% cellulose content. The dilute viscose was purified by passing through an anion exchange column and then neutralized to pH 7 by mixing with Amberlite IRC 50 H+ resin. The treated viscose was then passed through a cation exchange column containing Dowex 50WX8 resin in the calcium salt form. The effluent from the column was a stable solution of calcium cellulose xanthate having a pH of 5.5

The calcium cellulose xanthate product was identified by total sulfur, xanthate sulfur, and calcium analyses. The product contained about 11.5% xanthate sulfur based on cellulose content. The calcium cellulose xanthate was precipitated by treatment with 10% hydrochloric acid and filtered. The filtrate was treated with sulfuric acid to precipitate calcium sulfate, and calcium was determined to be about 4.0–4.1% based on the weight of cellulose. The ratio of sulfur to calcium atoms was 3.50:1. When a solution of calcium cellulose xanthate is impregnated into kraft pulp in the form of a paper web and is regenerated thermally, as described above, there is produced a high wet strength paper product.

EXAMPLE 7

In this example, the procedure used in the previous examples was followed in converting viscose to the aluminum salt of cellulose xanthate.

Viscose, as used in the previous examples, was diluted to a 0.5% cellulose content and purified by passing through an anion exchange resin and neutralized to pH 8 by admixture with Amberlite IRC 50 H+ resin.

A stainless steel column was charged with Dowex 50WX8 resin which was converted to the aluminum salt form by treatment with aluminum nitrate solution. The dilute, neutralized viscose was passed through the column containing the cation resin in the aluminum salt form, and an effluent was obtained consisting of a stable solution of aluminum cellulose xanthate. The aluminum cellulose xanthate solution was a stable solution for more than 24 hours.

The aluminum cellulose xanthate product was identified by aluminum, total sulfur, and xanthate sulfur analyses. The product contained about 1.5% aluminum and had a sulfur/aluminum atomic ratio of about 5:1. The aluminum cellulose xanthate prepared by ion exchange reaction is considerably more stable in aqueous solution than aluminum cellulose xanthate prepared by metathetic reaction with soluble aluminum salts.

When aluminum cellulose xanthate is extruded through an annular die into a hot oil bath, a tubular thermally regenerated cellulose casing is obtained which is pigmented with precipitated aluminum salts. The casing containing aluminum salts can be dyed in a variety of colors using various lake dyes which are held in the casing by the finely divided and dispersed aluminum salts.

When aluminum cellulose xanthate is impregnated into a paper web and thermally regenerated there is obtained a high wet strength paper product containing aluminum salts which can be dyed in a variety of colors using various lake dyes which are held in the casing by the finely divided and dispersed aluminum salts.

EXAMPLE 8

In this example, benzyltrimethylammonium cellulose xanthate was prepared from viscose by ion exchange reaction.

The procedure of Example 1 was followed by using a cation exchange resin, Dowex 50WX8, which had been converted to the salt form by treatment with benzyltrimethylammonium hydroxide solution. The viscose was diluted to a 0.5% cellulose content and purified by passing through the anion exchange column and mixing with Amberlite IRC 50 H+ resin to reduce the pH to 7.5.

The dilute, neutralized viscose was then passed through the exchange column containing the benzyltrimethylammonium salt of the exchange resin. The effluent from the column was a stable aqueous solution of benzyltrimethylammonium cellulose xanthate. The product had a pH of 8.9 and gelled at room temperature after 32 hours. The product had a nitrogen content of about 1.1% and a xanthate sulfur content of 11.4%.

Benzyltrimethylammonium cellulose xanthate can be converted into a shaped regenerated cellulose product by acid or thermal regeneration. Benzyltrimethylammonium cellulose xanthate can be extruded to form regenerated cellulose film, filaments, tubular casings, and the like, by treatment with acid or by heating for a period of 15–30 minutes at 100° C. Solutions of benzyltrimethylammonium cellulose xanthate can also be used to impregnate paper webs and after thermal or acid regeneration produce a high wet strength paper product. When the thermal regeneration of cellulose is carried out using this compound, the by-products are volatile and removed from the cellulose product.

In the various examples set forth throughout this specification, the preliminary ion exchange treatment and neutralization of the viscose or other polymeric alcohol xanthate solution is for the purpose of removing by-products and ensuring the production of a relatively pure product. The polymeric alcohol xanthates can, if desired, be treated with a cation exchange resin containing the desired cation. Without this preliminary treatment, a relatively impure product is obtained. In removing impurities from xanthate solutions by anion exchange, a large variety of anion exchange materials can be used including, but not limited to, the following: intermediate base anion exchangers, e.g., Dowex 2; strong base anion exchangers, e.g., De-Acidite FS, Amberlite IRA 400, Amberlite IRA 410, Dowex 1, Nalcite SAR; porous anion exchangers, e.g., Duolite S30, as well as naturally occurring anion exchangers, e.g., proteins containing ionizable amino groups, polymeric betaines, etc. In addition, ion retardation resins, such as Retardion 11A8 (product of the Dow Chemical Company) can be used for removal of impurities. In the removal of basic constituents from the xanthate solution, any of a variety of cation exchange materials, in the acid form, can be used: sulfonated phenolic resins, e.g., Zeo-Karb 215, Zeo-Karb 315, Amberlite IR1, Amberlite IR100, Duolite C10, Duolite C3, Dowex 30, sulfonated polystyrenes, e.g., Zeo-Karb 225, Amberlite IR120, Duolite C20, Dowex 50, and Nalcite HCR; sulfonated coal, e.g., Zeo-Karb H1; nuclear substituted phosphonate resins, e.g., Duolite C60 and Duolite C61; carboxylic resins, e.g., Zeo-Karb 216, Zeo-Karb 226, Amberlite IRC 50, Duolite CS100, acid treated zeolites; naturally occurring nonresinous ion exchange materials, e.g., cellulose, wood fibers (blast fiber) including fabricated forms thereof such as webs, papers, fabrics, and the like. Reference to ion exchange materials or ion exchange resins in claims is intended to be generic to ion exchange materials of the high capacity resinous type, to liquid ion exchangers, and to naturally occurring nonresinous ion exchange materials such as acid treated coal, cellulose wood fibers, fabrics, webs, paper, and the like which are known to have ion exchange properties. The cation exchange resins can be used in the acid form for the decausticization and purification of viscose or other polymeric alcohol xanthate solutions prior to conversion of the xanthate to various salt derivatives. Likewise, these cation exchange materials can be used as the source of the desired cation for conversion of the xanthate salts as previously described.

While the invention described so far is primarily concerned with the conversion of viscose into other xanthate salt derivatives by ion exchange reaction, and the use of such xanthate derivatives in the preparation of high wet strength webs it is apparent that the process is equally applicable to the preparation of xanthate salt derivatives of other polymeric alcohols and the use of such derivatives in the preparation of high wet strength webs. The preparation of such derivatives is generally in accordance with the procedures already described but will be set forth more fully in the following nonlimiting examples:

EXAMPLE 9

A high purity amylose (derived from corn) containing about 10% water and having a DP of about 700–900 was used in the formation of an amylose xanthate solution analogous to viscose.

An alkaline solution of 24% concentration (1580 g. water and 300 g. sodium hydroxide) was prepared and mixed with 300 ml. methanol and 150 g. amylose. The thick slurry which was formed was stirred for about 10 min. and 200 ml. additional methanol added, and the more dilute slurry stirred for 1 hr. at 25° C. The slurry was mixed with 5.1 liters of methanol to precipitate and shrink the amylose. The supernatant layer was decanted and found to contain 270 g. of sodium hydroxide. The gel which remained was left to dry in thin layers and to depolymerize or age.

The alkali amylose which was produced was allowed to dry and age for 43 hrs. at 25° C. to reduce the DP of the amylose so that high amylose xanthate concentrations in alkali could be obtained. The gel weight was about 870 g. and comprised 12.6% alkali, 16% amylose, and 71% water. The alkali amylose (870 g.) was spread on the bottom and on the porcelain plate of a 12-in. vacuum desiccator. Nitrogen purging was carried out, and a vacuum was then applied. About 70 g. of carbon disulfide was drawn into the desiccator and the system allowed to stand in a water bath at 25° C. After about 5.25 hrs., the alkali amylose had turned to a carrot yellow-orange color. The vacuum was applied to the desiccator to remove excess carbon disulfide for a period of about 20 min. The product obtained consisted of 898 g. of sodium amylose xanthate. This product was refrigerated at −20° C. for 6 days before solutions were prepared from it.

One solution was prepared by mixing the sodium amylose xanthate with an equal weight of water for 2 hrs. using a 2½ in. marine-type propeller as an agitator. The mixture was maintained at a temperature less than 15° C. during solution. The resulting viscous solution was filtered through a filter muslin and had a 6% alkali content (both free sodium hydroxide and combined sodium) and 8% amylose. A portion of this solution was further diluted to form a 4% amylose solution.

Both the 4% and 8% amylose solutions were decausticized by mixing and agitating with Amberlite IRC 50 H+ exchange resin. This treatment removed excess alkali from the alkali amylose xanthate solution and reduced the pH thereof to about pH 8–9. The 4% amylose xanthate solution was obtained as a viscous liquid. The 8% amylose xanthate solution gelled as a result of this treatment.

A portion of the 4% sodium amylose xanthate solution is diluted to an amylose content of about 1%. The diluted sodium amylose xanthate solution is then passed through a cation exchange column containing Dowex 50WX8 cation exchange resin in the form of the triethylammonium salt, as used in Example 1. The dilute sodium amylose xanthate solution is passed through the column, and the product obtained from the column is a dispersion and solution of the triethylamine salt of amylose xanthate. When the procedure of this example is repeated using other cation exchange resins in the form of the triethylamine salt, triethylammonium amylose xanthate is obtained as the product.

The solution of triethylamine amylose xanthate may be used in the preparation of regenerated amylose films or in the impregnation of fibrous webs or papers to form high wet strength paper products upon acid or thermal regeneration.

EXAMPLE 10

The cation exchange column as described in the previous example is charged with Duolite C60 resin in the acid form and converted to the triethylamine salt. Sodium amylose xanthate is prepared in the form of a dilute solution as described in Example 9 and is passed through the column. The effluent from the column is collected and consists of a stable solution of triethylamine amylose xanthate.

EXAMPLE 11

The ion exchange column as described in the previous examples is charged with Zeo-Karb 226 resin in the acid form and converted to the triethylamine salt. Aqueous sodium amylose xanthate as in the previous examples is allowed to feed through the column and produces an effluent consisting of triethylammonium amylose xanthate.

EXAMPLE 12

In this example, dilute sodium polyvinyl alcohol xanthate is converted by ion exchange reaction to the barium salt.

A stainless steel column is charged with Dowex 1X8, 20–50 mesh resin and converted to the hydroxyl form by treatment with dilute sodium hydroxide. A second column is charged with Dowex 50WX8 ion exchange resin in the hydrogen ion form and converted to the barium salt by treatment with a barium salt solution.

The sodium polyvinyl alcohol xanthate used in this example is prepared in accordance with the procedure of B. G. Ranby, described in Die Makromolekulare Chemie, November 1960, p. 68 et seq. The sodium polyvinyl alcohol xanthate used in this example is diluted to a 0.50% polyvinyl alcohol content and purified by passing it through the anion exchange column (containing Dowex 1X8 OH−). The treated xanthate salt solution is then mixed with Zeo-Karb 226 resin, in the hydrogen form, and the pH of the solution reduced to a value of about 7–8.

The diluted and neutralized sodium polyvinyl alcohol xanthate is then passed through the column containing the barium salt of Dowex 50WX8 resin, and an effluent is obtained which is a stable solution of the barium polyvinyl alcohol xanthate.

The solution of barium polyvinyl alcohol xanthate may be used to form films or to impregnate fibrous webs or paper and regenerated by either thermal or acid treatment to produce a regenerated polyvinyl alcohol film or polyvinyl alcohol reinforced web which is colored by the barium salts which are produced during the decomposition of the barium polyvinyl alcohol xanthate.

EXAMPLE 13

A stainless steel column is charged with Dowex 1X8, 20–50 mesh anion exchange resin and converted to the hydroxyl form by treatment with dilute sodium hydroxide. A cation exchange column of similar size is prepared by passing a cadmium salt solution through a bed of Dowex 50WX8 H+ ion exchange resin.

In this example, sodium polyvinyl alcohol xanthate is prepared, diluted, and purified as in Example 12. The sodium polyvinyl alcohol xanthate solution is passed through the cation exchange resin containing combined cadmium ions, and an effluent is obtained consisting of a solution of cadmium polyvinyl alcohol xanthate.

When the solution of cadmium polyvinyl alcohol xanthate is used to impregnate a fibrous web and regenerated thermally there is produced a high wet strength paper product which is pigmented with the cadmium salts produced during the decomposition of the cadmium polyvinyl alcohol xanthate.

EXAMPLE 14

In this example, the procedure in Examples 12 and 13 is followed except that the cation exchange column is converted to a pyridine salt by passing 5% pyridine through Dowex 50WX8 H+ exchange resin. The sodium polyvinyl xanthate is prepared as previously described, diluted to a 0.5% polyvinyl alcohol content, passed through the anion exchange column, and treated with Amberlite IRC 50 H+ resin as previously described. The diluted and nautralized sodium polyvinyl alcohol xanthate is then passed through the column containing the cation exchange resin in the pyridine salt form. The effluent from the column consists of a stable aqueous solution of pyridine polyvinyl alcohol xanthate.

When the solution of pyridine polyvinyl alcohol xanthate is used to treat a fibrous web or paper and thermally regenerated there is produced a high wet strength web which is essentially free of by-products as a result of the thorough volatilization of the decomposition products of the polyvinyl alcohol xanthate.

EXAMPLE 15

In this example, sodium polyallyl alcohol xanthate is converted to the corresponding potassium salt following the procedure used in the previous examples. Sodium polyallyl alcohol xanthate is prepared following the procedure of B. G. Ranby, op. cit.

The sodium polyallyl alcohol xanthate is diluted to a polyallyl alcohol content of 0.5% and purified by passing through the ion exchange column and neutralized with an acidic ion exchange resin to reduce the pH to a value of about 7. The purified and neutralized sodium polyallyl xanthate is then passed through a column containing Dowex WX8 in a potassium salt form. The effluent from the column consists of a stable solution of potassium polyallyl alcohol xanthate.

When the solution of potassium polyallyl alcohol xanthate is used to treat a fibrous web or paper and thermally regenerated there is produced a high wet strength product.

EXAMPLE 16

The procedure described in the previous examples is followed in converting the sodium polyallyl alcohol xanthate to the corresponding calcium salt.

The sodium polyallyl alcohol xanthate is prepared as previously described and diluted to a 1.0% polyallyl alcohol content. The dilute solution is purified by passing through an anion exchange column and neutralized to pH 7 by admixture with an acidic ion exchange resin. The treated solution is then passed through a cation exchange column containing Dowex 50WX8 resin in the calcium salt form.

The effluent from the column consists of a stable solution of calcium polyallyl alcohol xanthate having a pH of about 6.5.

When the solution of calcium polyallyl alcohol xanthate is used to impregnate a fibrous web or paper and thermally regenerated there is produced a high wet strength web containing polyallyl alcohol as a regenerated film containing calcium by-products salts as a pigment.

EXAMPLE 17

In this example, the procedure used in the previous examples is followed in converting sodium polyallyl alcohol xanthate to the aluminum salt.

The polyallyl alcohol xanthate is prepared in the form of the sodium salt as described in the previous examples and purified by ion exchange treatment. The sodium polyallyl alcohol xanthate solution is then passed through a stainless steel column charged with Dowex 50WX8 resin which has been converted to the aluminum salt form by treatment with aluminum nitrate solution. The effluent from the column consists of a stable solution of aluminum polyallyl alcohol xanthate.

When the solution of aluminum polyallyl alcohol xanthate is used to impregnate a fibrous web or paper and thermally regenerated there is produced a high wet strength web containing a polyallyl alcohol film and aluminum by-product salts as a pigment.

EXAMPLE 18

In this example, sodium polyallyl alcohol xanthate is converted to the corresponding benzyltrimethylammonium salt by ion exchange reaction.

The procedure of the previous examples is followed, using a cation exchange resin, Dowex 50WX8, which is converted to the salt form by treatment with benzyltrimethylammonium hydroxide solution.

Dilute, neutralized sodium polyallyl alcohol xanthate is passed through the exchange column containing the benzyltrimethylammonium salt of the exchange resin. The effluent from the column consists of a stable aqueous solution of benzyltrimethylammonium polyallyl alcohol xanthate.

When the solution of benzyltrimethylammonium polyallyl alcohol xanthate is used to impregnate a fibrous web or paper and thermally regenerated there is produced a high wet strength web which is largely free of by-products as a result of the high volatility of the by-products of decomposition of the xanthate.

The various polymeric alcohol xanthate salt derivatives prepared in accordance with this invention are useful for a variety of purposes. Solutions of these xanthate salts can be regenerated by acid or thermally to produce regenerated polymeric alcohol products, e.g., regenerated cellulose, amylose, dextran, polyvinyl alcohol, polyallyl alcohol, etc.

EXAMPLE 19

A clear, dilute solution of barium cellulose xanthate is prepared by ion exchange reaction as previously described. This solution is used to coat the fibers in a 14.5 lb., unsized, all hemp fiber tissue paper to a cellulose content of 0.01–5.0%, and the cellulose is regenerated by heating at 105° C. for 15 min. The paper coated and impregnated with regenerated cellulose has improved wet strength and is pigmented with by-product barium salts produced in the thermal regeneration of the cellulose.

EXAMPLE 20

Aluminum amylose xanthate is prepared by ion exchange reaction as described above and amylose film regenerated therefrom by thermal treatment. The regenerated film is pigmented with finely divided or colloidal hydrous aluminum salts. The pigmented film can be readily dyed with any of the well known lake dyes.

While this invention has been described with reference to several preferred embodiments, this invention can be practiced otherwise than as specifically described herein.

I claim:
1. A method of preparing a high wet strength web which comprises coating a fibrous web with an aqueous solution of a xanthate salt produced by treating an alkaline solution of a xanthate salt of a polymeric alcohol to remove substantially all free alkali therein without precipitating said xanthate salt, and then ion exchanging said solution by passing the solution through a column containing cation exchange material in the form of an insoluble ion exchange salt of a desired cation, in an amount sufficient to provide 0.01–5.0% addon of the polymeric alcohol, and regenerating the polymeric alcohol therein.

2. A method in accordance with claim 1 in which the polymeric alcohol is cellulose, amylose, polyvinyl alcohol, or polyallyl alcohol.

3. A method in accordance with claim 1 in which the treated web is formed into a tube prior to regenerating the polymeric alcohol.

4. A method in accordance with claim 2 in which the xanthate salt of a polymeric alcohol used to treat the web is a salt of a cation selected from the group consisting of monovalent metal cations other than sodium, divalent metal cations, trivalent metal cations, and non-metal cations.

5. A method in accordance with claim 4 in which the xanthate solution used to treat the web is in form of a salt of cadmium, nickel, calcium, barium, aluminum, potassium, quaternary ammonium or pyridinium.

References Cited

UNITED STATES PATENTS

| | | | |
|---|---|---|---|
| 1,852,466 | 4/1932 | McConnell | 260—218 |
| 1,974,755 | 9/1934 | Schur | 260—218 |
| 1,977,445 | 10/1934 | Laucks | 260—218 X |
| 2,296,857 | 9/1942 | Lilienfeld | 260—217 X |
| 2,825,655 | 3/1958 | Meadows | 260—216 |
| 2,992,880 | 7/1961 | Toms | 264—195 |
| 3,135,613 | 6/1964 | Underwood | 117—157 X |

WILLIAM D. MARTIN, *Primary Examiner.*

M. LUSIGNAN, *Assistant Examiner.*

U.S. Cl. X.R.

117—62.1, 155, 156, 157, 161, 165, 166

UNITED STATES PATENT OFFICE
CERTIFICATE OF CORRECTION

Patent No. 3,429,735            Dated February 26, 1969

Inventor(s) Douglas J. Bridgeford

It is certified that error appears in the above-identified patent and that said Letters Patent are hereby corrected as shown below:

Column 3, line 4, "0.7" should read -- 0.1 --.
Column 5, line 27, "10.25%" should read -- 10.24% --.
Column 6, line 48, change the period to a comma.

Signed and sealed this 2nd day of May 1972.

(SEAL)
Attest:

EDWARD M. FLETCHER, JR.          ROBERT GOTTSCHALK
Attesting Officer                Commissioner of Patents